INVENTORS
FRANK W. SIERACKI
THOMAS COOMBE
BY Theodore Jay Jr.
ATTORNEY

INFORMATION STORAGE AND DISPLAY SYSTEM

Filed March 28, 1969 3 Sheets-Sheet 2

INVENTORS
FRANK W. SIERACKI
THOMAS COOMBE
BY
Theodore Jay Jr.
ATTORNEY

INVENTORS
FRANK W. SIERACKI
THOMAS COOMBE
BY
Theodore J...
ATTORNEY

United States Patent Office 3,555,523
Patented Jan. 12, 1971

3,555,523

INFORMATION STORAGE AND DISPLAY SYSTEM

Frank W. Sieracki and Thomas Coombe, Berlin, N.J., assignors to Ultrasonic Systems Corporation, a corporation of Delaware Filed Mar. 28, 1969, Ser. No. 822,785
Int. Cl. G11c 21/00
U.S. Cl. 340—173 11 Claims

ABSTRACT OF THE DISCLOSURE

Eight video monitors are supplied with display information from a common memory. The displays can but need not differ from each other in information content. Information recirculating in series-bit, series-character form is converted to parallel-bit, series-character format. Through use of switching apparatus, recirculation buffers and a dot matrix encoder, the parallel-bit, series-character information is encoded into the form of a dot matrix. During odd numbered memory cycles, a first group of four monitors is actuated, the monitors in this group being successively enabled. During even numbered memory cycles, a second group of the other four monitors is actuated, the monitors in this group also being successively enabled.

BRIEF DESCRIPTION OF THE INVENTION

In our invention, information, such as stock market transactions, stored in a single memory is to be displayed visually by a plurality of remotely disposed video monitors. This information can take the form of alpha-numeric characters. The displays of the various monitors can be totally independent in content from each other, but partial or complete duplication is possible. Typically, eight monitors are used.

Each monitor utilizes a display field of two hundred and sixty scan lines generated at a field rate of sixty fields per second. In each display field, the first or top sixty-five lines are always blank (i.e., contain no display information). The middle group of one hundred and thirty lines which constitute one half is divided into thirteen consecutive rows of ten consecutive lines each. The odd numbered rows in this group (i.e., the first, third . . . thirteenth rows) can be blank. The even numbered rows (i.e., the second, fourth . . . twelfth rows) can be used for character display. Alternatively, the even numbered rows can be blank while the odd numbered rows can be used for display. Thus, there are six display rows. Each display row contains thirty-six characters.

The memory is of the serial recirculation type in which the information, in character-series, bit-series form, is recirculated at a rate of one hundred and twenty cycles per second. The memory cycles at a rate which is twice the field rate.

Each monitor displays each character in the form of a dot matrix which can vary from five by seven to five by ten. Thus, as many as ten scan lines are used for complete display of a character, each line providing a different horizontal slice of the same character.

Each time the memory completes one cycle, four monitors are enabled to each display the one half field which contains the information for display. During odd numbered cycles of the memory, a first group of four monitors is enabled and, during even numbered cycles of the memory, a second group containing the remaining four monitors is enabled.

Information is transferred out of the memory in bit-series, character-series format and is converted to character-series, bit-parallel format. Through the use of time division techniques, as an odd numbered memory cycle is begun, the first and second monitors of the first group are each successively enabled to display their first display rows and then the third and fourth monitors of the first group are each successively enabled to display their first display rows. These monitors are then enabled in the same manner to display their second display rows, and this process continues until the memory has completed its odd numbered cycle, and all monitors in the first group have been enabled to complete the display of the one half information containing fields. During the next (even numbered) memory cycle, the monitors in the second group are successively enabled in the same manner to display their one half information containing fields. While the monitors in one group are displaying their information containing half fields, the monitors in the other group are displaying the other (blank) half fields.

The memory stores information in the form of memory rows. Thirteen memory rows of information are used and are made successively available during each memory cycle. The thirteenth row is not used for display. Each of the thirteen rows can contain one hundred and forty-four characters, divided into four sections of thirty-six characters each. During any one memory cycle, either the first two sections or the last two sections in each row are used for display, while the two unused sections are used for display during the next cycle. Thus, the first and second sections in the first memory row represent the first display rows of the first and second monitors in the first group, and the third and fourth sections in the first memory row represent the first display rows of the first and second monitors in the second group. The first and second sections in the second memory row represent the first display rows of the third and fourth monitors in the first group and the third and fourth sections in the second memory row represent the first display rows of the third and fourth monitors in the second group. This sequence and arrangement is repeated with the remaining memory rows. Consequently, the twelve memory rows contain the information to be displayed by all the monitors.

The information in the memory, after being converted and transferred in bit-parallel, series-character format, is transformed to the dot matrix format prior to display. Moreover, since up to ten scan lines are used in displaying a single character, the character information must be repetitively recycled with such timing as to be made available for use each time an additional scan line is to be generated.

Means in the form of first and second recirculatory buffers are used for this purpose. The odd-numbered memory rows are read out in numerical succession from the memory into the first recirculatory buffer; the even-numbered memory rows are read out in numerical succession from the memory into the second buffer. Information is read out from these buffers to a dot coder. The timing is such that information is read into one buffer from the memory while information is read out of the other buffer into the dot coder and vice versa. Each buffer has a capacity of seventy-two characters and recirculates either the first two sections or the last two sections of a memory row, depending upon the particular memory cycle. Gate control apparatus associated with the buffers determines the selection of the desired two sections of a memory row for recirculation.

The dot coder converts information supplied from the buffers in bit-parallel character-series format into the correct dot matrix format for display. The dot coder, actuated by suitable timing signals and having a built in code, responds to any character supplied to it to derive therefrom that portion of the corresponding dot matrix required for the particular scan line then in use by the appropriate monitor. For example, when the first buffer is recirculating the seventy-two characters representing the first two sections of the first memory row, these characters pass successively in timed sequence to the dot coder which successively derives therefrom that portion of the dot matrix pattern for each character which is to be displayed on the first scan line of the first display row by each of the first and second monitors in the first group. Means are provided for routing the first half of this portion (representing the first section of thirty-six characters) to the first monitor and routing the second half of this portion (representing the second section of thirty-six characters) to the second monitor. (These means also route the appropriate patterns with appropriate timing to each of the other monitors.) The same seventy-two characters are recirculated in the first buffer and are again presented to the dot coder which derives therefrom that portion of the dot matrix pattern which is to be displayed on the second scan line. This process is repeated until the first complete display row of ten scan lines has been displayed by the first two monitors of the first group.

Then the seventy-two characters representing the first two sections of the second memory row (which were loaded into the second buffer while the content of the first buffer were supplied to the dot coder) are supplied in the same manner from the second buffer to the dot coder, while the first two sections of the third memory row are loaded into the first buffer. The first two sections of the second memory row are used to form the first complete display row of ten scan lines for the remaining two monitors of the first group.

The above process is repeated until each of the four monitors in the first group has completed its half information containing field display and the memory has completed one cycle. Upon the next memory cycle, the buffers recirculate the seventy-two characters representing the third and fourth sections of the memory rows, and the above process is repeated until each of the monitors in the second group has completed its half information containing field display and the memory has completed its next cycle.

DETAILED DESCRIPTION OF PREFERRED EMBODIMENTS

Figure 1:
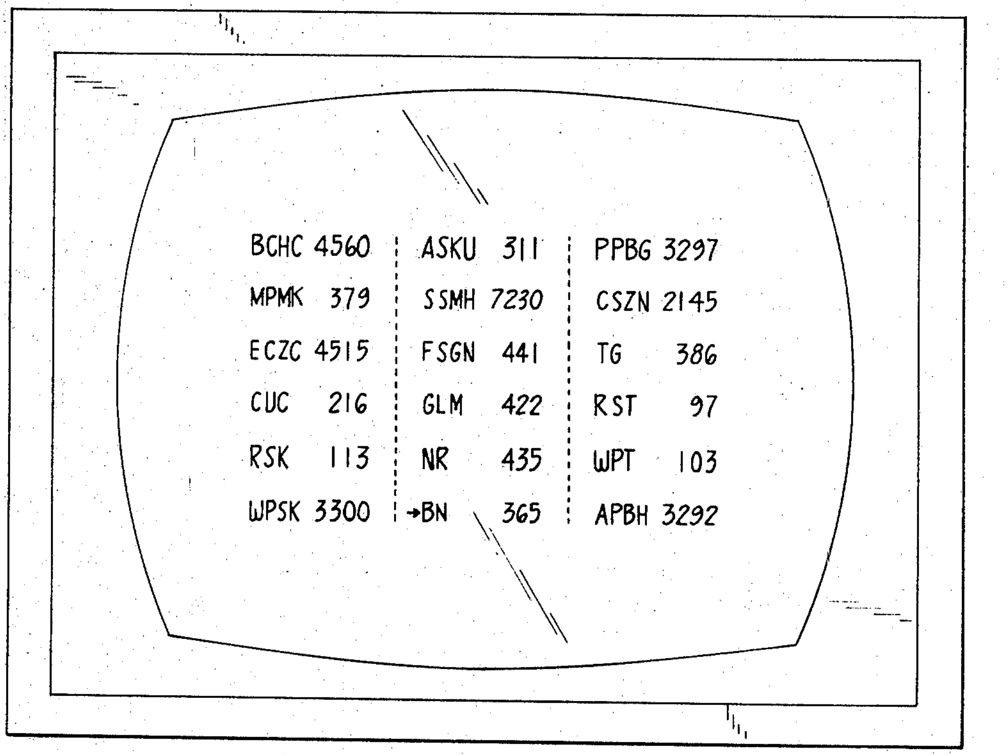
FIG. 1 illustrates a typical display field of a monitor enabled in accordance with my invention.

Referring first to FIG. 1, there is shown a typical display field of a monitor illustrating, for example, certain information about eighteen different stocks sold on the New York Stock Exchange. Each stock is identified by a code of up to four letters followed by up to four digits which designate the current price. This information is arranged into three columns and six rows. More particularly, the field is composed of two hundred and sixty scanning lines. The first sixty-five and last sixty-five lines in the field are blank. The middle of the field contains one hundred and thirty lines divided into thirteen consecutive rows, each row containing ten consecutive lines.

In the field shown, the odd numbered rows in this group are blank and the even numbered rows contain the display. Each row contains thirty-six characters divided into three groups of twelve characters each. (Blank spaces between adjacent letters and numbers are provided to promote ease of reading. Each such space occupies a character space.) The monitors each use either this field arrangement or a slight modification in which six consecutive odd numbered rows are used for display and the remaining odd numbered row and all even numbered rows are blank. The field rate is sixty fields per second.

Figure 2A:
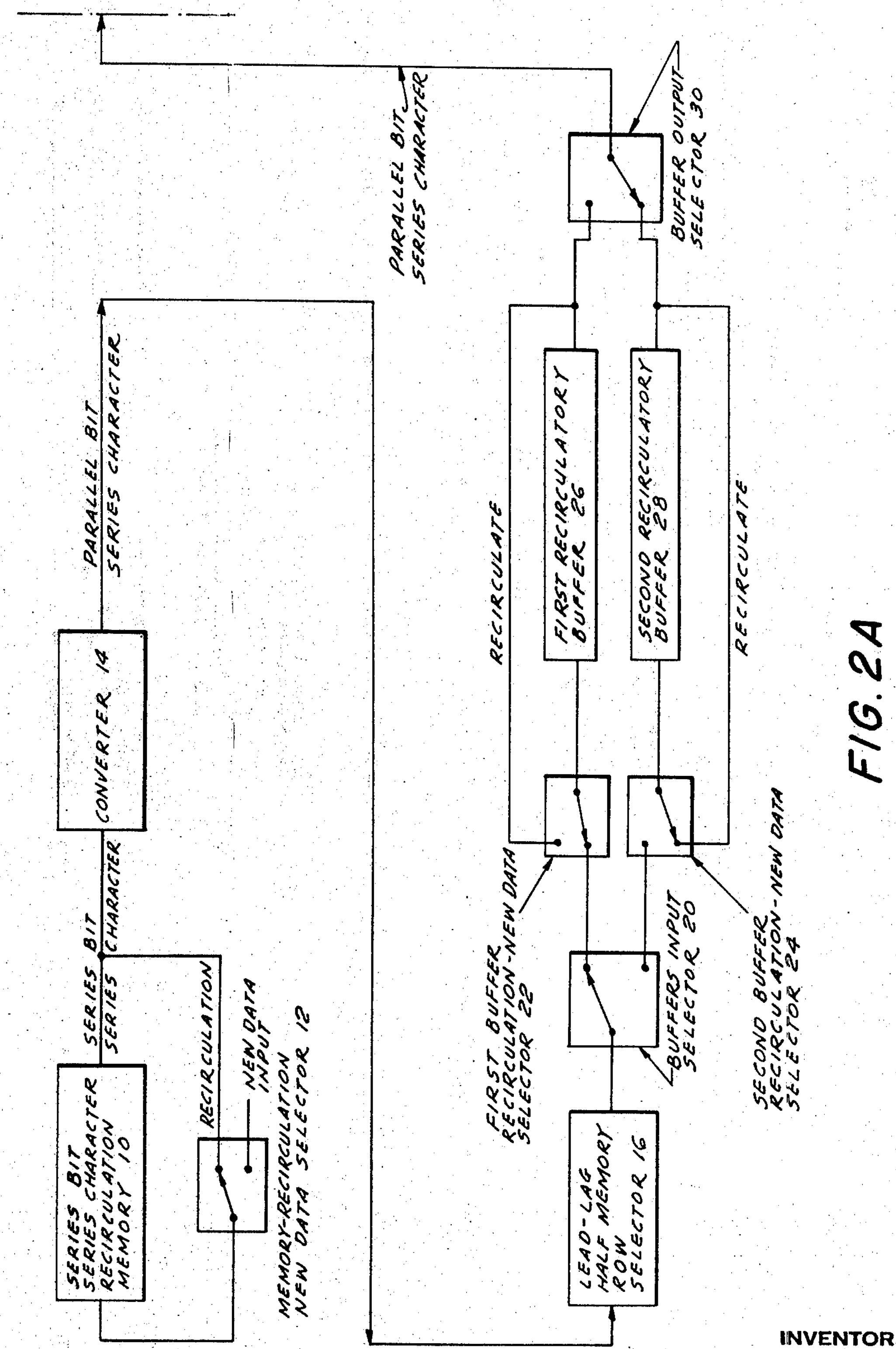
FIG. 2 consisting of FIGS. 2*a* and 2*b* is a block diagram illustrating the principles of our invention.
Figure 2B:
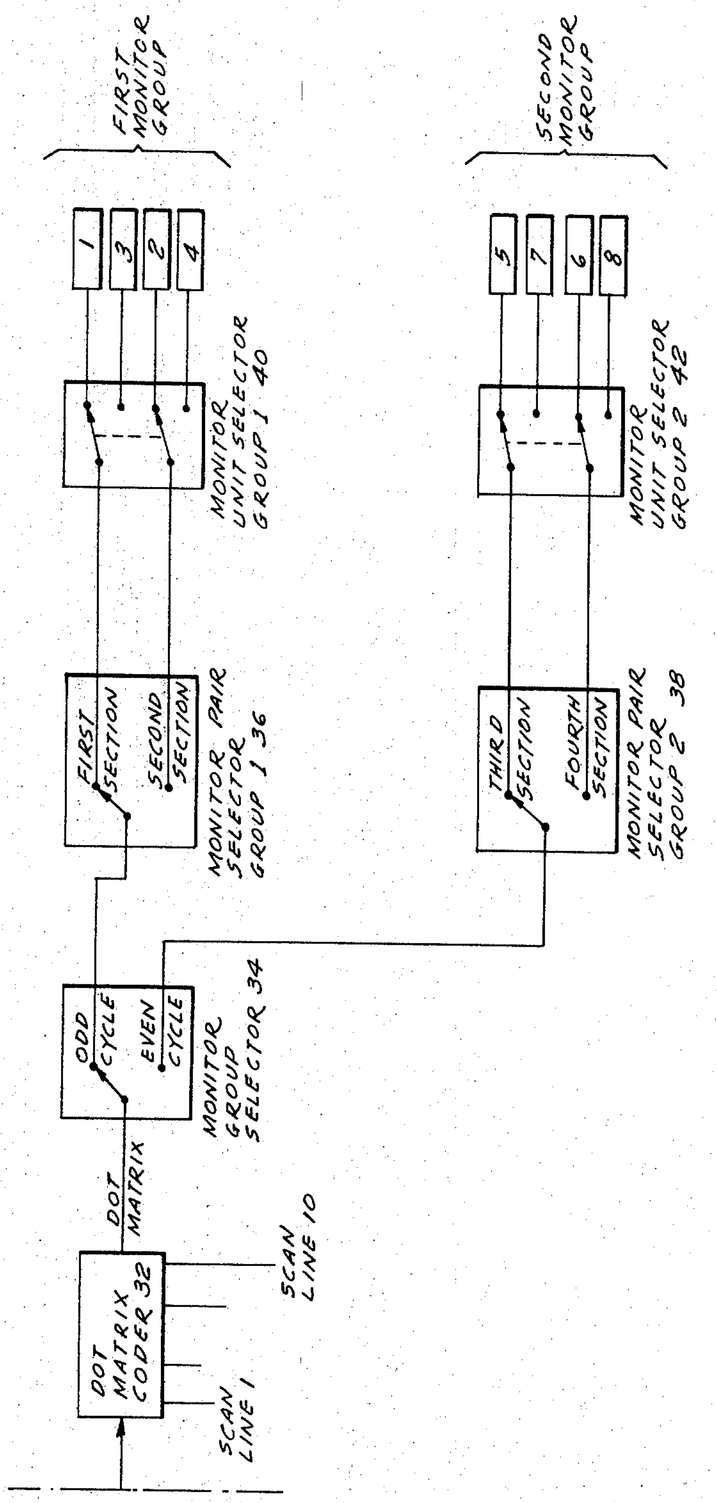

Referring now to FIG. 2, a series-bit, series-character format recirculating memory 10 for example, a magnetrostrictive delay line, contains thirteen consecutive memory rows. The thirteenth memory row is blank. All rows have the same capacity of one hundred and forty-four characters but only twelve rows are filled. Each character is represented by a six bit code wherein electrical pulses and pulse spaces are inter-leaved in accordance with the specific code employed to define different characters. Each row is divided into first, second, third and fourth consecutive sections, each section containing thirty-six characters. By interconnecting the two ends of the delay line, and introducing suitable amplification and pulse reshaping circuitry therebetween, complete recirculation occurs at a rate of one hundred and twenty cycles per second. Recirculation can occur only when the two position memory recirculation-new data selector 12 is in the recirculation position shown. When the selector 12 is in the new data position, characters are erased to leave blanks which can be filled with new data whereby the information in the memory is changed as required. Selector 12 is the functional equivalent of the conventional pair of reverse acting read in and erase gates.

The information in the memory is read out in bit series, character series form and is supplied to a converter 14 which converts the information into parallel bit, series character form. This conversion can be carried out for example by using a series input, parallel output, six bit register.

As previously described, during odd numbered memory cycles, only the first two sections of information in each memory row are used for display while the last two sections of information in each memory row are not used, while during even numbered memory cycles the action is reversed; i.e., the first two sections of each memory row are not used while the last two sections of each row are used for display. Since the information yielded by the converter is in parallel-bit series-character format, this section selection can be carried out by using gates which are opened and closed at such timing as to pass only those sections desired for use in display and to block the other sections.

The functional equivalent of these gates is represented in the drawings by a lead-lag half row selector 16. The selector 16 determines, whether the first half of the memory row (i.e., the first two sections) or the last half (i.e., the last two sections) are to be used for display, depending upon the memory cycle. The first half row is selected during odd numbered cycles while the second half row is selected during even numbered cycles.

The output of selector 16 is connected to the input of buffers input selector 20. Selector 20 has two outputs which are connected to the input terminals of first buffer recirculation-new data selector 22 and second buffer recirculation-new data selector 24 respectively. Each of selector 22 and 24 is connected at its output to a corresponding input of the first recirculatory buffer 26 and the second recirculatory buffer 28 respectively. The output of each buffer is connected (if necessary through amplifiers and pulse reshaping circuitry) to the recirculation terminal of the corresponding one of selectors 22 and 24 as well as to buffer output selector 30.

As has been stated earlier, the buffers function with such timing that information is read into one buffer via its selector 22 or 14 while information is read out of the other buffer via selector 30 and vice versa. The first half or last halves (depending upon memory cycle) of each odd numbered memory row are read in numerical succession into buffer 26. The first or last halves of each even numbered memory row are read in numerical succession into buffer 28. Each buffer (which can take the form of a solid state shift register) has a seventy-two character capacity. Information is read into a buffer when its selector 22 or 24 connects the input of the buffer to the output of selector 20; information is both recirculated and made available for read out in any buffer when its selector interconnects the buffer input to its output. The selector 22 and 24 can be of the same type as selector 12.

The output of each buffer in turn is connected via selector 30 to the input of the dot matrix coder 32. Since the contents of any buffer are recirculated ten times to enable the coder to produce the desired dot matrix, the recirculation is synchronized with the supply to the coder of control signals representing the ten different scan lines. It will be recalled that the coder, actuated by these signals and having a built-in code, responds to any character supplied to it from a buffer to derive that portion or slice to be carried on the corresponding scan line then in use by the corresponding monitor.

Monitors designated by numbers 1, 3, 2 and 4 are in the first monitor group. Monitors designated by numbers 5, 7, 6 and 8 are in the second monitor group. The first group is enabled during odd numbered memory cycles; the second group is enabled during even numbered memory cycles. The circuitry necessary for this purpose is shown functionally as monitor group selector 34, monitor pair selector group one 36, monitor pair selector group two 38, monitor unit selector group one 40 and monitor unit selector group two 42.

By action of these selectors, during odd numbered memory cycles, monitors 1, 2, 3 and 4 are each enabled video row by video row in sequence, i.e., first monitor 1 receives its first video row, then monitor 2 receives its first video row, then monitor 3 receives its first video row, then monitor 4 receives its first video row. This process is repeated until these four monitors have received all video information for one field. During even numbered memory cycles, monitors 5, 6, 7 and 8 are each successively enabled in the same manner.

More particularly, selector 34 selects which group of monitors is to be enabled and therefore whether selectors 36 and 40 or selectors 38 and 42 are to be used. Selectors 36 routes the first and second sections alternately to selector 40. Selector 40 routes the first section alternately to units 1 and 3 and the second section alternately to units 2 and 4. Similarly selector 38 routes the third and fourth sections alternately to selector 42. Selector 42 routes the third section alternately to units 5 and 7 and the fourth section alternately to units 6 and 8.

It will be understood that proper timing is required for operation of the selectors and other components. This is accomplished by supplying properly timed control pulses to the various components for opening and closing gates, shifting characters and the like. Use of such timing pulses is well known and will not be described in detail herein.

The horizontal and vertical drive circuitry for the monitors are conventional and are not shown. The vertical and horizontal synchronizing pulses are produced and supplied via the same unit that produces the control pulses described above.

All components shown have to be interconnected by a common ground. The ground connections have been omitted from the drawing in the interest of clarity.

Typical gates, timing and control circuitry, dot coders and the like suitable for use herein are shown in the copending application of R. S. Roberts, Ser. No. 657,664 filed Aug. 1, 1967 for Video Display Apparatus and assigned to the assignee of the present application.

While we have described our invention with particular reference to the embodiments shown in the drawings, our protection is to be limited only by the terms of the claims which follow.

What is claimed is:

1. An information storage system comprising:

(a) a serial recirculation memory containing information in bit-series, character-series format which is recirculated at a selected fixed rate, said information being arranged in successive memory rows, each row containing the same number of characters;

(b) first means for sequentially reading out all of the information in said memory and converting said readout information into character-series, bit-parallel format;

(c) second means rendered responsive during odd numbered memory cycles to yield at its output a selected one of the leading and lagging half portions of each memory row and to block the other half portion, said second means being rendered responsive during even numbered memory cycles to block said selected half portions and yield at its output said other half portions;

(d) first and second recirculatory buffers, each buffer having a capacity of one half a memory row;

(e) third means interconnecting said buffers in a manner at which when either one of the buffers receives at its input incoming information and is in a nonrecirculatory condition, the other buffer is in a recirculatory condition and receives no incoming information, said third means enabling the information in the buffer in recirculatory condition to be made available while withholding information contained in the buffer in non-recirculatory condition; and (f) fourth means for insuring that information in odd numbered memory rows is read in to a selected one of said buffers while information in even numbered memory rows is read in to the other of said buffers.

2. An information storage system comprising:

(a) a serial recirculation memory containing information in bit-series, character-series format which is recirculated at a selected fixed rate, said information being arranged in N successive memory rows, each row containing A characters, where N and A are integers and A is even;

(b) first means coupled to said memory for sequentially reading out all of the information in said memory and converting said readout information into character-series, bit-parallel format;

(c) second means coupled to said first means and rendered responsive during odd numbered memory cycles to yield at its output a selected one of the leading and lagging half portions of each memory row and to block the other half portion, said second means being rendered responsive during even numbered memory cycles to block said selected half portions and to yield at its output said other half portions;

(d) first and second recirculatory buffers, each buffer having a capacity of $A/2$ characters;

(e) third means interconnecting said buffers in a manner at which when either one of the buffers receives at its input incoming information and is in a nonrecirculatory condition, the other buffer is in a recirculatory condition and receives no incoming information, said third means enabling the information in the buffer in recirculatory condition to be made available while withholding information contained in the buffer in non-recirculatory condition; and (f) fourth means coupled between said second and third means to insure that information in odd numbered memory rows is read in to a selected one of said buffers while information in even numbered memory rows is read in to the other of said buffers.

3. A system as set forth in claim 2 further including a dot matrix coder supplied at its input with information made available by said third means.

4. A system as set forth in claim 3 further including first and second groups of video monitors, each group containing B monitor units when B is an integer, and fifth means coupling said coder to the monitors in one of said groups during odd numbered memory cycles while disconnecting said coder from the monitors in the other group, said fifth means reversing the connections between said coder and the monitor groups during even numbered memory cycles.

5. A system as set forth in claim 4 wherein each buffer recirculates information up to ten times.

6. A system as set forth in claim 5 wherein N is at least equal to twelve.

7. A system as set forth in claim 6 wherein A is equal to seventy-two.

8. A system as set forth in claim 2 further including additional means coupled to said memory to inhibit recirculation during a selected period and to insert new information during that period.

9. A system as set forth in claim 4 wherein said fifth means includes a monitor group selector.

10. A system as set forth in claim 9 wherein said fifth means also includes a pair of monitor pair selectors.

11: A system as set forth in claim 10 wherein said fifth means also includes a pair of monitor unit selectors.

References Cited

UNITED STATES PATENTS 3,288,928 11/1966 Bartlett ____________ 340—173

TERRELL W. FEARS, Primary Examiner

U.S. Cl. X.R.

178—50

UNITED STATES PATENT OFFICE

CERTIFICATE OF CORRECTION

Patent No. 3,555,523 Dated January 12, 1971

Inventor(s) Frank W. Sieracki et al.

It is certified that error appears in the above-identified patent and that said Letters Patent are hereby corrected as shown below:

In the heading to the printed specification, line 5, "Ultrasonic Systems Corporation" should read -- Ultronic Systems Corporation --.

Signed and sealed this 15th day of June 1971.

(SEAL)
Attest:

EDWARD M.FLETCHER,JR.
Attesting Officer

WILLIAM E. SCHUYLEF
Commissioner of Pat